United States Patent [19]

Wakabayashi et al.

[11] 4,278,853
[45] Jul. 14, 1981

[54] BATTERY CASE INCLUDING A MAIN SWITCH DEVICE

[75] Inventors: Hiroshi Wakabayashi, Yokohama; Takeshi Okuyama, Kawasaki, both of Japan

[73] Assignee: Nippon Kogaku K.K., Tokyo, Japan

[21] Appl. No.: 14,954

[22] Filed: Feb. 26, 1979

[30] Foreign Application Priority Data

Mar. 1, 1978 [JP] Japan .............................. 53-25847[U]

[51] Int. Cl.³ ........................................... H01H 15/00
[52] U.S. Cl. .................................. 200/16 D; 200/60; 362/194; 362/204
[58] Field of Search ..................... 200/60, 16 C, 16 D; 362/194, 204

[56] References Cited

U.S. PATENT DOCUMENTS

| | | | |
|---|---|---|---|
| 2,464,184 | 3/1949 | Pearce | 200/16 C |
| 2,599,295 | 6/1952 | Thomas | 200/60 |
| 2,908,827 | 10/1959 | Hickman | 200/16 D |
| 3,229,053 | 1/1966 | Smith | 200/16 D |

Primary Examiner—J. V. Truhe
Assistant Examiner—Morris Ginsburg
Attorney, Agent, or Firm—Shapiro and Shapiro

[57] ABSTRACT

A battery case has a main switch device in a lid which is capable of being coupled to a battery chamber body. The main switch device is operable, when coupled to said body, so as to interrupt the connection between the two electrodes of a battery. The lid includes a frame member engageable with the battery chamber body and having an inner wall and an outer wall, a pair of electrode contacts extending through the inner wall, and switch operating means having a switch member and an operating member. The main switch device may be reliably closed and opened. With the main switch device, the dust-proof and moisture-proof properties of the battery case are not impaired.

6 Claims, 4 Drawing Figures

BATTERY CASE INCLUDING A MAIN SWITCH DEVICE

BACKGROUND OF THE INVENTION

1. Field of the Invention

This invention relates to a battery case including a main switch device, and more particularly to a battery case in which a main switch device which will be convenient if used as the lid of the battery chamber of a motor drive unit or the like in a camera.

2. Description of the Prior Art

A battery case having a main switch device is known in which a slot is formed in the lid of the battery containing portion of a flash discharge light emitter and a pivotable switch member is disposed on such lid so that movement is imparted to a battery by causing the riser piece of the pivotable switch member to rise and thereby connect and disconnect a power supply circuit. As disclosed, for example, in Japanese Utility Model Publication No. 53-978.

However, in the device disclosed in the aforementioned Publication, the battery is connected by causing the riser piece of the pivotable switch member to rise and, therefore, in this state, the riser piece is projected from the surface of the lid. This has the disadvantage that the connection to the battery may be inadvertently broken. Also, in the main switch of the prior art, the pivotable switch member extends through the lid and, therefore, the inside and the outside of the battery containing portion are spatially connected, impairing the dust-proof and moisture-proof properties of the interior of the battery containing portion. Further, the main switch device of the prior art has required a space in which the battery may move when the switch member is operated.

SUMMARY OF THE INVENTION

It is an object of the present invention to provide a battery case including a main switch device in the lid of a battery chamber which may be reliably closed and opened and in which the dust-proof and moisture-proof properties are not of the case impaired.

The invention will become more fully apparent from the following detailed description thereof taken in conjunction with the accompanying drawings.

DESCRIPTION OF THE PREFERRED EMBODIMENTS

Figure 1:
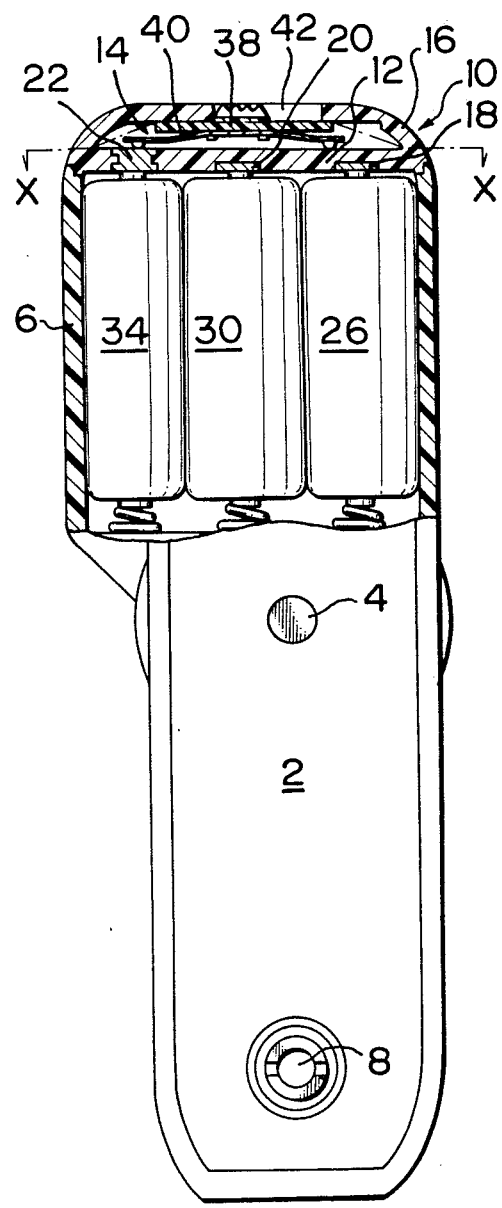
FIG. 1 is a cross-sectional view showing an embodiment of the present invention.
Figure 2:
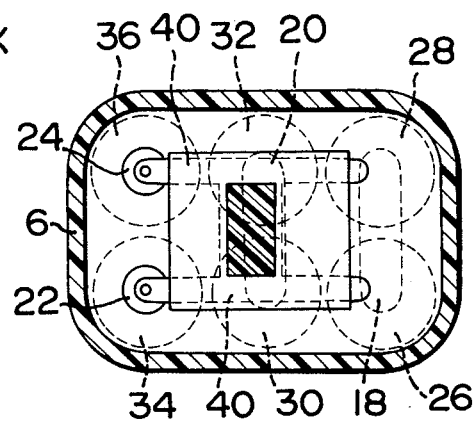
FIG. 2 is a cross-sectional view taken along line X—X in FIG. 1.
Figure 3:
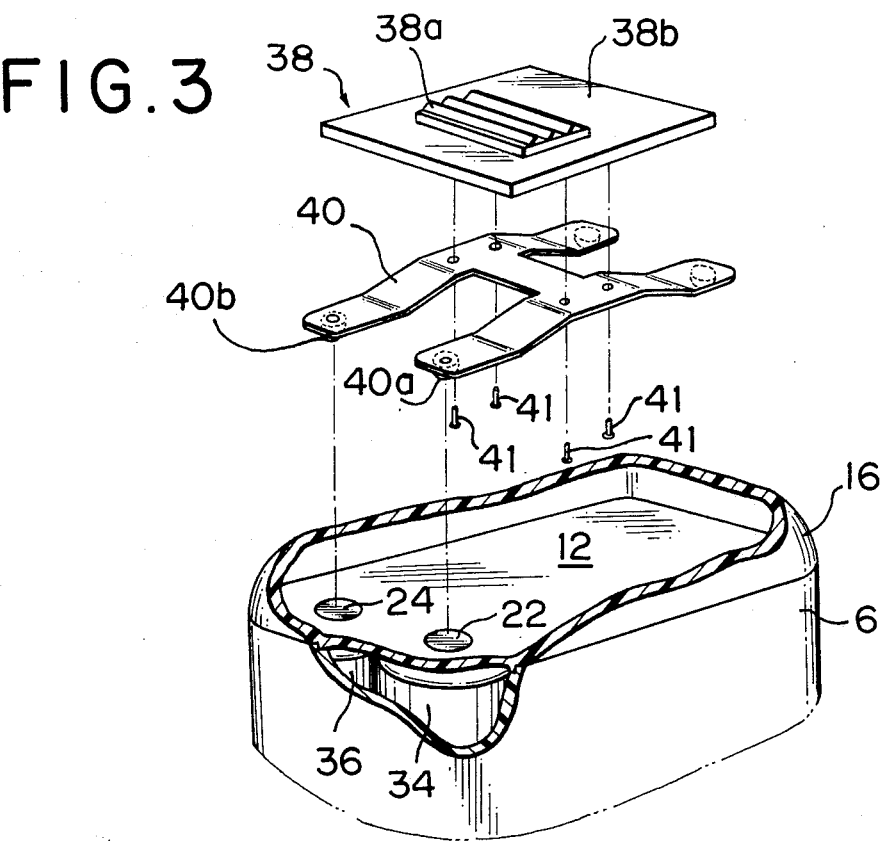
FIG. 3 is an exploded perspective view showing essential portions of the embodiment of FIG. 1.

Referring to FIGS. 1 to 3, a motor drive unit 2 has a male screw 4 located substantially centrally thereof which may be threaded into a tripod hole of a camera, not shown, and has a battery chamber 6 and a connecting terminal 8 at opposite ends thereof, the connecting terminal 8 being connectable to the film advance shaft of the camera, not shown. The lid 10 of the battery chamber 6 comprises a frame formed by a plastic inner wall 12 covering the opening of a battery chamber 6 and a plastic outer wall 16 adjacent to the inner wall 12 to form a space between the inner and outer walls for containing therein a slide switch 14. On the underside of the inner wall 12 which is opposed to the battery, there are provided electrode plates 18 and 20 adapted for connection to batteries 26, 28, 30 and 32 within the battery chamber and electrode contacts 22 and 24 adapted for connection to batteries 34 and 36. The electrode plate 18 connects the positive pole of the battery 26 to the negative pole of the battery 28. Likewise, the electrode plate 20 connects the positive pole of the battery 30 to the negative pole of the battery 32. The electrode contacts 22 and 24 are in contact with the electrodes of the batteries 34 and 36, respectively, and are embedded in the inner wall 12 so as to penetrate to the back side portion of the inner wall 12 facing the space between the inner wall 12 and the outer wall 16 in which the slide switch 14 is located. The six batteries are adapted to be series-connected when the electrode contacts 22 and 24 are connected together by the slide switch. A switch operating opening 42 is formed substantially centrally of the outer wall 16, and the operating projection 38a of an operating member 38 for the slide switch 14 is slidably engaged in the opening 42. A shield plate 38b of the operating member covers this opening 42 to seal the space between the inner and outer walls from dust and moisture.

As shown in FIGS. 2 and 3, a switch contact piece 40 formed of a metallic spring of H-shaped planar configuration having terminals 40a and 40b is secured to the operating member 38 by means of screws 41. The switch contact piece slides on the back side portion of the inner wall 12 when the operating member is moved so as to close and open the electrode contacts 22 and 24. The operating member 38 and the switch contact piece 40 together constitute the slide switch 14. By its spring resiliency, the switch contact piece 40 urges the operating member shield plate 38b against the outer wall 16. Thus, the slide switch 14 is sandwiched in the space formed between the inner wall 12 and the outer wall 16. With such a construction, it is possible to select a position where the switch contact piece 40 is in contact with the electrode contacts 22 and 24 and a position where the switch contact piece 40 is not in contact with the electrode contacts 22 and 24 by sliding the operating member projection 38a back and forth within operating opening 42 to thereby slide the switch contact piece 40 on the back side portion of the inner wall 12. When the switch contact piece 40 is brought into contact with the electrode contacts 22 and 24, the two contacts are connected and the six batteries are series-connected. When the switch contact piece 40 is separated from the electrode contacts 22 and 24, the connection between the batteries 34 and 36 is broken. Therefore, the slide switch 14 can be used as a main switch.

Figure 4:
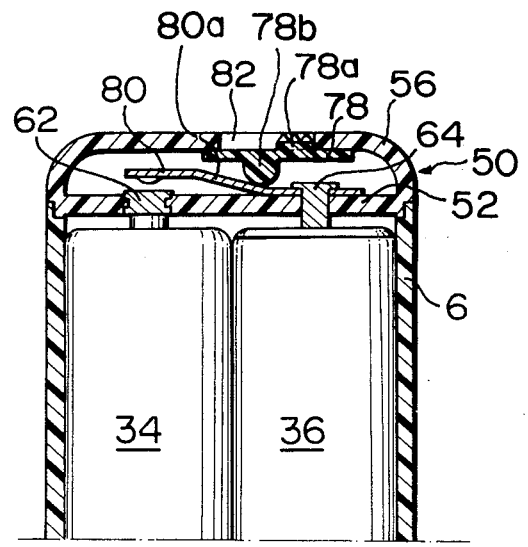
FIG. 4 shows a second embodiment of the present invention.

FIG. 4 shows a main switch device according to another embodiment of the present invention. A lid 50 has switch means provided in a space surrounded by a frame member which again comprises an inner wall 52 and an outer wall 56. The switch means comprises a switch contact piece 80 having a central portion 80a and formed of a metallic spring having one end secured to a terminal 64, and a switch member 78 having an operating portion 78a slidably fitted in an opening 82 in the outer wall and a projection 78b engageable with the control portion 80a of the switch contact piece 80. In the inner wall 52, an electrode contact 62 contacts the positive pole of the battery 34 and electrode contact 64 extends through the inner wall 52 and contacts the negative pole of the battery 36. In contrast to the batteries of the first embodiment, the negative pole of battery 36 is constituted by the planar end of the battery. The electrode contact 64 is connected to said one end of the switch contact piece 80 as described, while the electrode contact 62 is capable of contacting the switch contact piece 80 when the switch contact piece is displaced by the operating member 78.

Thus, when the switch member 78 is caused to slide by moving the operating position 78a, the projection 78b depresses the central portion 80a of the switch contact piece 80 so that the switch contact piece 80 is brought into contact with the electrode contact 62 to thereby connect the batteries 34 and 36.

According to the main switch device of the present invention, the slide switch formed by the operating member and the switch contact piece can slide by a relatively large amount within the space formed between the inner and outer walls of the lid of the battery chamber thereby ensure closing and opening of the power source and to prevent inadvertent ON-OFF of the power source. Moreover, the lid and the battery chamber may have cooperating stepped portions as shown in FIGS. 1 and 4 so that the lid may be fitted snugly in the opening of the battery chamber to shield the battery chamber, ensuring that the dust-proof and moisture-proof properties of the battery chamber are not impaired.

We claim:

1. A battery case comprising a battery chamber body having a chamber therein for receiving battery means and formed with an opening for loading the battery means into the chamber, a lid member engageable with the battery chamber body for closing said opening, the lid member having an inner wall located adjacent to the chamber and an outer wall located adjacent to the inner wall so as to define an enclosed space between said inner wall and said outer wall and having an aperture in said outer wall, at least a pair of electrode contacts extending between first and second surfaces of said inner wall, each of said electrode contacts having a first end located on said first surface of the inner wall and exposed to said enclosed space and a second end located on said second surface of the inner wall and exposed to said chamber, said second end being positioned to contact an electrode of the battery means received within the chamber, and switch means located within said enclosed space, the switch means having a switch member formed of conductive resilient material and being adapted for displacement between a first position at which the switch member connects said first ends to connect said electrode contacts together and a second position at which the switch member is incapable of connecting said first ends, and an operating member being operable through the aperture in the outer wall and being slidable with respect to the aperture, the operating member being effective to displace the switch member between said first and second positions by said sliding.

2. A battery case according to claim 1 further comprising a plurality of electrode plates embedded within the inner wall and having a plurality of exposed portions on said second surface for interconnecting a plurality of electrodes of said battery means located within the chamber.

3. A battery case according to claim 1, wherein the operating member comprises an operating projection located within said aperture and a shield plate attached to the operating projection, the shield plate being positioned against the surface of the outer wall within the enclosed space and being dimensioned to cover said aperture at any position to which the operating member is moved by said sliding.

4. A battery case according to claim 3, wherein said switch member has a pair of terminals engageable with said first ends of the pair of electrode contacts, said terminals being slidable on the first surface of said inner wall, and the switch member is attached to the operating member and is slidable therewith.

5. A battery case according to claim 3, wherein the switch member is part of an element having a fixed portion connected to a first one of said first ends of the electrode contacts, and has a movable terminal capable of contact with a second one of said first ends and a central portion connecting said fixed portion to the movable terminal, and wherein the operating member has a projection engageable with said central portion for displacing the movable terminal to said first position by said sliding.

6. A battery case according to claim 1, wherein the inner wall is formed for snug engagement with said battery chamber body in order to seal said chamber when the lid member closes the opening.

* * * * *